United States Patent
Sun (10) Patent No.: US 9,946,467 B2
(45) Date of Patent: Apr. 17, 2018

(54) DATA STORAGE METHOD AND ELECTRONIC DEVICE

(71) Applicant: Lenovo (Beijing) Co., Ltd., Haidian District, Beijing (CN)

(72) Inventor: Qingtao Sun, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 64 days.

(21) Appl. No.: 14/972,797

(22) Filed: Dec. 17, 2015

(65) Prior Publication Data

US 2017/0083233 A1 Mar. 23, 2017

(30) Foreign Application Priority Data

Sep. 23, 2015 (CN) .......................... 2015 1 0613260

(51) Int. Cl.
*G06F 12/02* (2006.01)
*G06F 3/06* (2006.01)
*G06F 12/0831* (2016.01)

(52) U.S. Cl.
CPC ............ *G06F 3/061* (2013.01); *G06F 3/0653* (2013.01); *G06F 3/0656* (2013.01); *G06F 3/0659* (2013.01); *G06F 3/0679* (2013.01); *G06F 12/0831* (2013.01); *G06F 2212/621* (2013.01)

(58) Field of Classification Search
None
See application file for complete search history.

(56) References Cited

U.S. PATENT DOCUMENTS

| 8,738,839 B2 | 5/2014 | Tian | |
|---|---|---|---|
| 2009/0292887 A1* | 11/2009 | Manczak | G06F 1/30 711/162 |
| 2014/0089584 A1* | 3/2014 | Pan | G06F 12/08 711/118 |
| 2015/0109859 A1* | 4/2015 | Hsu | G11C 16/225 365/185.03 |

FOREIGN PATENT DOCUMENTS

| CN | 101499313 | 8/2009 |
|---|---|---|
| CN | 102402397 | 4/2012 |

OTHER PUBLICATIONS

First Office Action (25 pages including English translation) dated Oct. 20, 2017 from Chinese priority Application No. 201510613260.0.

* cited by examiner

*Primary Examiner* — Duc Doan
(74) *Attorney, Agent, or Firm* — Brinks Gilson & Lione; G. Peter Nichols (57) ABSTRACT

A data storage method and an electronic device are described where the method includes acquiring a running status parameter of an electronic device; determining, on the basis of the running status parameter, a data storage policy corresponding to the running status parameter; acquiring, on the basis of the data storage policy, target data corresponding to the data storage policy; and writing, on the basis of a data category of the target data, the target data into a flash or a cache of a solid state memory of the electronic device. The method is for solving the technical problem that the system's data writing manner is fixed.

7 Claims, 3 Drawing Sheets

DATA STORAGE METHOD AND ELECTRONIC DEVICE

This application claims priority to Chinese patent application No. 201510613260.0 filed on Sep. 23, 2015, the entire contents of which are incorporated herein by reference.

The present application relates to the field of electronic technique, and more particularly, to a data storage method and an electronic device.

BACKGROUND

SSD is an abbreviation of Solid State Drives (solid state memory), an SSD controller mainly provides access control from host access to flash particles. Because of write characteristics of the flash, as for one access cell, first erasing must be performed, then writing can be made. The erase operation will cause low write performance of a system.

To solve the above problem, RAM (random access memory) is added into SSD as a cache, when data is written, it needs to first write data into the cache, and then writes data back into the flash when the system is idle or when the cache is full. This can reduce write latency and writes into the flash particles, thereby increasing a life length of the flash.

However, in the process of effectuating the technical solutions of the present application, the inventor of the present application finds that the above technique at least has the following technical problem:

The system's data writing manner is fixed, not flexible enough.

SUMMARY

The present application provides a data storage method and an electronic device, for solving the technical problem that the system's data writing manner is fixed.

In an aspect, an embodiment of the present application provides an data storage method, comprising: acquiring a running status parameter of an electronic device; determining, on basis of the running status parameter, a data storage policy corresponding to the running status parameter; acquiring, on basis of the data storage policy, target data corresponding to the data storage policy; and writing, on basis of a data category of the target data, the target data into a flash or a cache of a solid state memory of the electronic device.

Optionally, acquiring a running status parameter of an electronic device comprises: acquiring a power remaining parameter of the electronic device.

Optionally, determining, on basis of the running status parameter, a data storage policy corresponding to the running status parameter comprises: determining whether the power remaining parameter is less than or equal to a first power threshold; and when the power remaining parameter is less than or equal to the first power threshold, determining that the data storage policy is to write data stored in the cache and data that the electronic device needs to write into the solid state memory into the flash.

Optionally, determining, on basis of the running status parameter, a data storage policy corresponding to the running status parameter comprises: determining whether the power remaining parameter is greater than a second power threshold; and when the power remaining parameter is greater than the second power threshold, determining that the data storage policy is to write data that the electronic device needs to write into the solid state memory into the cache.

Optionally, acquiring a running status parameter of an electronic device comprises: acquiring a data feature of data being currently written by the electronic device into the cache; wherein determining, on basis of the running status parameter, a data storage policy corresponding to the running status parameter comprises: determining whether the data feature meets a predetermined condition; and when the data feature meets the predetermined condition, determining that the data storage policy is to write data that the electronic device needs to write into the cache into the flash.

Optionally, the method further comprises: acquiring a plurality of data access operations performed by a user based on the electronic device; analyzing the plurality of data access operations, to obtain an analysis result; and adjusting, on basis of the analysis result, the data storage policy.

In another aspect, an embodiment of the present application also provides an electronic device, comprising: a solid state memory; the solid state memory includes a storage device and a storage controller; the storage controller is for determining, on basis of a running status parameter of the electronic device received, a data storage policy corresponding to the running status parameter; acquiring, on basis of the data storage policy, target data corresponding to the data storage policy; and writing, on basis of a data category of the target data, the target data into a flash or a cache of the solid state memory of the electronic device.

Optionally, the electronic device further comprises: a system event monitoring module for acquiring a running status parameter of the electronic device.

Optionally, the system event monitoring module is specially for: acquiring a power remaining parameter of the electronic device.

Optionally, the storage controller is specifically for: determining whether the power remaining parameter is less than or equal to a first power threshold; and when the power remaining parameter is less than or equal to the first power threshold, determining that the data storage policy is to write data stored in the cache and data that the electronic device needs to write into the solid state memory into the flash.

Optionally, the storage controller is specifically for: determining whether the power remaining parameter is greater than a second power threshold; and when the power remaining parameter is greater than the second power threshold, determining that the data storage policy is to write data that the electronic device needs to write into the solid state memory into the cache.

Optionally, the system event monitoring module is specially for: acquiring a data feature of data being currently written by the electronic device into the cache; the storage controller is specifically for: determining whether the data feature meets a predetermined condition; and when the data feature meets the predetermined condition, determining that the data storage policy is to write data that the electronic device needs to write into the cache into the flash.

Optionally, the system event monitoring module is further for: acquiring a plurality of data access operations performed by a user based on the electronic device; the storage controller is specifically for: analyzing the plurality of data access operations, to obtain an analysis result; and adjusting, on basis of the analysis result, the data storage policy.

In yet another aspect, an embodiment of the present application further provides an electronic device, comprising: a first acquiring unit for acquiring a running status parameter of the electronic device; a determining unit for determining, on basis of the running status parameter, a data storage policy corresponding to the running status parameter; a second acquiring unit for acquiring, on basis of the data storage policy, target data corresponding to the data storage policy; and a storing unit for writing, on basis of a data category of the target data, the target data into a flash or a cache of a solid state memory of the electronic device.

One or more technical solutions provided in embodiments of the present application described above at least have the following technical effects or advantages:

1. In the solution according to an embodiment of the present application, the following means are adopted: acquiring a running status parameter of an electronic device; determining, on basis of the running status parameter, a data storage policy corresponding to the running status parameter; acquiring, on basis of the data storage policy, target data corresponding to the data storage policy; and writing, on basis of a data category of the target data, the target data into a flash or a cache of a solid state memory of the electronic device. A different running status parameter corresponds to a different data storage policy, thereby the data storage policy can be determined flexibly according to the running status parameter of the electronic device, so that current data is written into the flash or the cache, thus mitigating the technical problem that the system's writing manner is fixed.

2. In the solution according to an embodiment of the present application, the running status parameter may be a power remaining parameter, and when the power remaining parameter is less than or equal to the first power threshold, i.e., the system has low power, data in the cache is written into the flash, and data that the electronic device needs to write subsequently is directly written into the flash, with the cache being skipped, thus solving the technical problem of system data loss caused by that when an abnormal power failure occurs the system, data in the cache fails to be written back into the flash in time, the technical effect of improving data security is achieved.

3. In the solution according to an embodiment of the present application, the following means are adopted: acquiring a data feature of data being currently written by the electronic device into the cache; determining whether the data feature meets a predetermined condition; and when the data feature meets the predetermined condition, determining that the data storage policy is to write data that the electronic device needs to write into the cache into the flash. In the embodiment of the present application, the predetermined condition may be set in advance, for example, a length of continuous write time of data, a data format etc., and when the data feature meets the predetermined condition, data is directly written into the flash. For example, when there is a large number of sequential write operations in the system, data is directly written into the flash particles with the cache being skipped, thus avoiding swapping out hot data in the cache, the hot data refers to data that resides in the cache and is frequently accessed by the electronic device.

4. In the solution according to an embodiment of the present application, the following means are adopted: acquiring a plurality of data access operations performed by a user based on the electronic device; analyzing the plurality of data access operations, to obtain an analysis result; and adjusting, on basis of the analysis result, the data storage policy. And the technical effect of smart-learning user behaviors to adjust the storage policy, so that the storage policy can better adapt to usage habits of the user, user experience is enhanced.

DETAILED DESCRIPTION

In the solutions according to the embodiments of the present application, a different running status parameter is corresponded to a different data storage policy, thereby the data storage policy can be determined flexibly according to the running status parameter of the electronic device, so that current data is written into the flash or the cache, thus mitigating the technical problem that the system's writing manner is fixed, the technical effect of flexibly determining the data storage policy according to the running status parameter of the electronic device can be achieved.

Hereinafter, main principles of implementing the technical solutions in the embodiments of the present application, specific embodiments thereof, and beneficial effects that can be achieved accordingly will be described in detail in conjunction with the accompanying drawings.

First Embodiment

Figure 5:
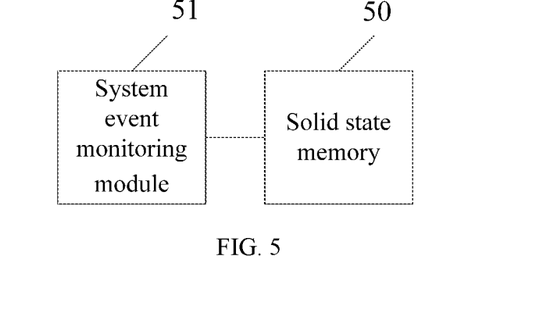
FIG. 5 is a structural block diagram of an electronic device in a second embodiment of the present application.
Figure 6:
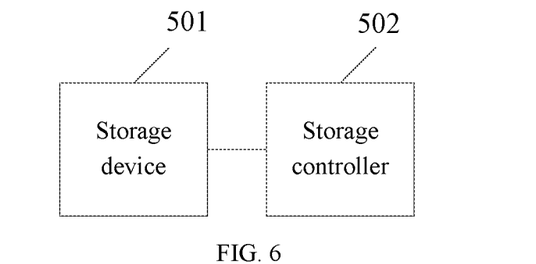
FIG. 6 is a structural block diagram of as solid state memory in a second embodiment of the present application.

In the embodiment of the present application, first, structure of an electronic device is described, as shown in FIGS. 5 and 6, the electronic device comprises:

a solid state memory 50;

the solid state memory 50 includes a storage device 501 and a storage controller 502;

the storage controller 502 is for determining, on basis of a running status parameter of the electronic device received, a data storage policy corresponding to the running status parameter; acquiring, on basis of the data storage policy, target data corresponding to the data storage policy; and writing, on basis of a data category of the target data, the target data into a flash or a cache of the solid state memory 50 of the electronic device.

The electronic device further comprises:

a system event monitoring module 51 for acquiring a running status parameter of the electronic device.

In the embodiment of the present application, the electronic device may be a computer, or other electronic devices that include a solid state memory, the present application makes no limitations thereto.

Figure 1:
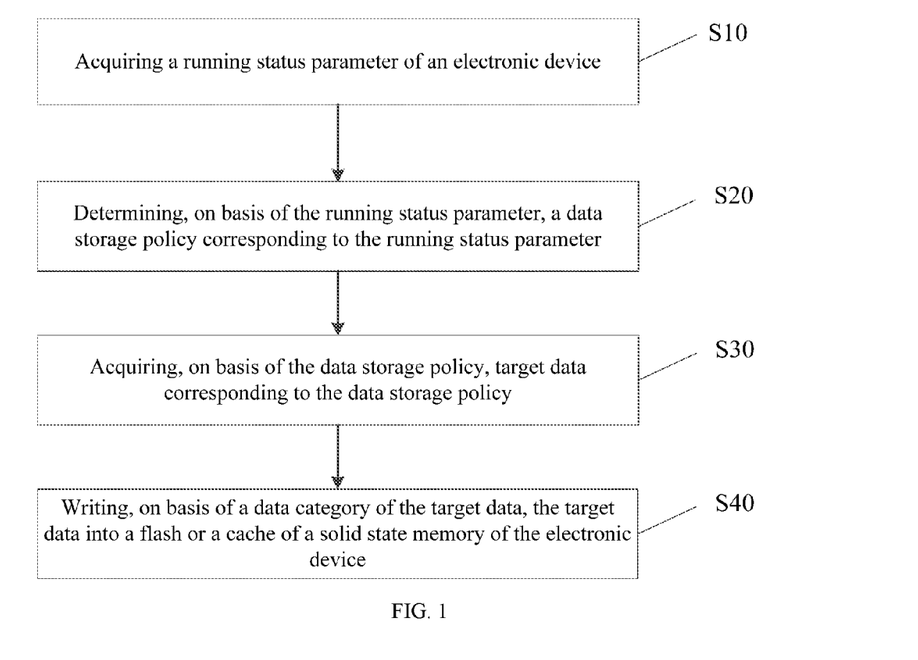
FIG. 1 is a schematic flowchart of a data storage method according to a first embodiment of present application.

Next, a data storage method provided by an embodiment of the present application will be described, as shown in FIG. 1, the method comprises:

S10: acquiring a running status parameter of an electronic device;

S20: determining, on basis of the running status parameter, a data storage policy corresponding to the running status parameter;

S30: acquiring, on basis of the data storage policy, target data corresponding to the data storage policy; and S40: writing, on basis of a data category of the target data, the target data into a flash or a cache of a solid state memory of the electronic device.

In S10, a system event monitoring module is added in an operating system, for monitoring a running status parameter of the electronic device. The running status parameter may be a status parameter of the electronic device per se, such as remaining power, it may also be a data feature of data being currently written into the cache, such as a length of continuous write time of data, a data format etc.

Thereafter, the system event monitoring module sends the monitored running status parameter to the storage controller, that is, controller of the flash.

Next, the electronic device executes S20: determining, on basis of the running status parameter, a data storage policy corresponding to the running status parameter.

In the embodiment of the present application, a different running status parameter is corresponded to a different data storage policy. Two types data storage policy will be described below.

Figure 2:
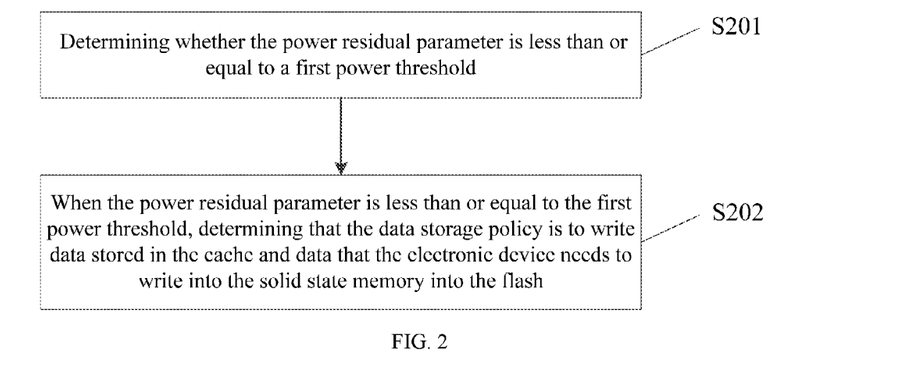
FIG. 2 is a schematic flowchart of a first implementation method of S20 in the first embodiment of the present application.

First type, the running status parameter is a power remaining parameter. Accordingly, S10 comprises: acquiring a power remaining parameter of the electronic device. As shown in FIG. 2, S20 comprises S201: determining whether the power remaining parameter is less than or equal to a first power threshold.

Specifically, the first power threshold may be set in advance in the electronic device, the first power threshold is used to represent low remaining power of the electronic device. For example, a power parameter is 100 when the electronic device has full power, then the first power threshold may be 10 or 15. It is assumed that the remaining power parameter is 9 and the first power threshold is 10, then it is determined as a result that the power remaining parameter is less than the first power threshold. In a specific implementation, it is also possible to determine other parameters such as remaining use time of the electronic device, the present application makes no limitations thereto.

Next, the electronic device executes S202: when the power remaining parameter is less than or equal to the first power threshold, determining that the data storage policy is to write data stored in the cache and data that the electronic device needs to write into the solid state memory into the flash.

Specifically, when the remaining power of the electronic device is low, if a person continues to use the electronic device, it may cause an auto power off of the electronic device due to low power, if there is data currently stored in the cache, then data in the cache could be lost. Thus when the power remaining parameter is less than or equal to the first power threshold, it indicates that the power of the electronic device is low, then the determined data storage policy is to write data stored in the cache and data that the electronic device needs to write into the solid state memory into the flash, thereby preventing data loss.

Further, the electronic device executes: determining whether the power remaining parameter is greater than a second power threshold. When the power remaining parameter is greater than the second power threshold, it indicates that the power of the electronic device is high, then the determined data storage policy is to write data that the electronic device needs to write into the solid state memory into the cache, thereby reducing writes into the flash particles, and increasing a life length of the flash.

Next, the electronic device executes S30: acquiring, on basis of the data storage policy, target data corresponding to the data storage policy.

In the embodiment of the present application, the target data may be data that is already written into the cache, and may also be data that the electronic device needs to write into the solid state memory subsequently.

Specifically, when the power of the electronic device is low, the data storage policy is to write data stored in the cache and data that the electronic device needs to write into the solid state memory into the flash, so the target data is data stored in the cache and data that the electronic device needs to write into the solid state memory. When the power of the electronic device is high, the data storage policy is to write data that the electronic device needs to write into the solid state memory into the cache, so the target data is data that the electronic device needs to write into the solid state memory.

Next, the electronic device executes S40: writing, on basis of a data category of the target data, the target data into a flash or a cache of a solid state memory of the electronic device.

In the embodiment of the present application, the data category includes at least two categories, a first category is data stored in the cache, and a second category is data that the electronic device needs to write into the solid state memory. If the target data is data stored in the cache, then the target data is written into the flash, if the target data is data that the electronic device needs to write into the solid state memory, the target data is written into the flash or the cache on basis of the data storage policy.

Figure 3:
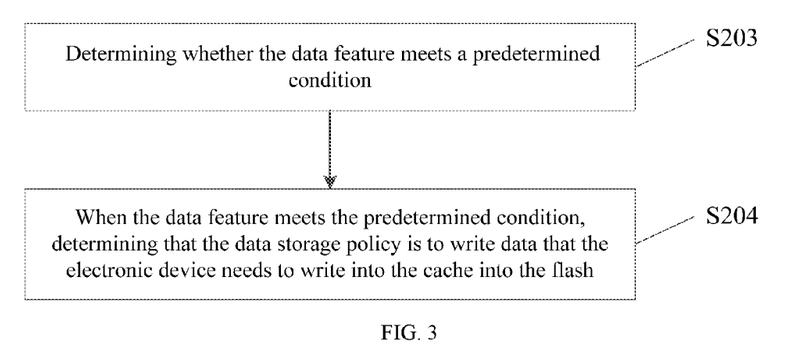
FIG. 3 is a schematic flowchart of a second implementation method of S20 in the first embodiment of the present application.

Second type, the running status parameter is a data feature of data being currently written by the electronic device into the cache. Accordingly, S10 comprises: acquiring a data feature of data being currently written by the electronic device into the cache. As shown in FIG. 3, S20 comprises:

S203: determining whether the data feature meets a predetermined condition.

In the embodiment of the present application, when the data feature is a length of continuous write time of data, the predetermined condition may be that the length of continuous write time of data is greater than or equal to a time length threshold; when the data feature is a data format, the predetermined condition may be that the data format is a specific format, such as a video format rmvb, avi, install packet jar, sis etc.; when the data feature is an amount of data written per unit time, the predetermined condition may be that the amount of data written per unit time is greater than or equal to a data amount threshold.

For example, the predetermined condition is that the length of continuous write time is greater than or equal to 5 s, it is assumed that the length of continuous write time of the data continuously written in the current exceeds 5 s, then it is determined that the data feature meets the predetermined condition; whereas when the length of continuous write time of the data continuously written in the current is 3 s, then it is determined that the data feature does not meet the predetermined condition. Another example, the predetermined condition is that the data format is rmvb, it is assumed that the format of data currently written into the cache is rmvb, then it is determined that the data feature meets the predetermined condition; whereas when the format of data currently written into the cache is doc, then it is determined that the data feature does not meet the predetermined condition.

Next, when the data feature meets the predetermined condition, the electronic device executes S204: when the data feature meets the predetermined condition, determining that the data storage policy is to write data that the electronic device needs to write into the cache into the flash. However, when the data feature meets the predetermined condition, data that the electronic device needs to write into the cache is written into the cache.

Specifically, when the data feature meets one or more of these predetermined conditions, a situation of writing a large amount of data into the cache will appear, but because the cache has a limit capability, if a large amount of data is written, if the cache is full, then data in the cache will be written into particles of the flash. If some hot data has been originally stored in the cache (data frequently accessed by the user, and in general, the user needs to always access them), writing a large amount of data will cause the hot data originally stored in the cache to be written into the flash, when the user uses the hot data next time, the user needs to read them from the flash, so the number of times of reading the flash increases.

For example, the user has been editing a word document, so the electronic device frequently reads word data stored in the cache, then said word data in the cache can be determined as hot data in the cache, it is assumed that a capability of the cache is 200 MzB, currently, the electronic device is downloading a movie, a size of the movie is 210 MB, if according to the rule that the downloaded data is first written into the cache, when the cache is full, the word data in the cache will be written into the flash, when the user uses the word data next time, the user needs to read them from the flash, so the number of times of reading the flash increases.

Therefore, when the data feature meets one or more of these predetermined conditions, for example, the data has a relatively long length of continuous write time, or the data format is a specific format, or an amount of data written per unit time is relatively large, the determined data storage policy is to directly write data that the electronic device needs to write into the cache into the flash, thus preventing the hot data in the cache from being swapped out For example, the predetermined condition is that the length of continuous write time is greater than a time length threshold, it is assumed that the time length threshold is 5 s, if a length of continuous write time of the data continuously written in the current exceeds 5 s, then the electronic devices will adopt a data storage policy (the electronic device directly writes data that needs to be written into the cache into the flash) to store downloaded data, that is, loaded data that is to be written into the cache subsequently will be directly written into the flash, with the cache being skipped.

Another example, in a process of downloading data, the system event monitoring module can monitor a large amount of sequential write operations. In this case, the amount of data written per unit time usually is relatively large, thus the predetermined condition is that the amount of data written per unit time exceeds a data amount threshold. It is assumed that the data amount threshold is 1 MB/s, then if the amount of data written per unit time exceeds 1 MB/s, the electronic devices will adopt a data storage policy (the electronic device directly writes data that needs to be written into the cache into the flash) to store downloaded data, that is, loaded data that is to be written into the cache subsequently will be directly written into the flash, with the cache being skipped.

In a specific implementation, it is possible to set the length threshold of continuous write time or the data amount threshed according to the capability of the cache, the present application makes no limitations thereto.

Next, the electronic device executes S30: acquiring, on basis of the data storage policy, target data corresponding to the data storage policy.

Specifically, when the data feature meets the predetermined condition, the target data is data that the electronic device needs to write into the cache.

After the target data is determined, the electronic device executes S40, comprising: writing, on basis of a data category of the target data, the target data into a flash or a cache of a solid state memory of the electronic device.

Figure 4:
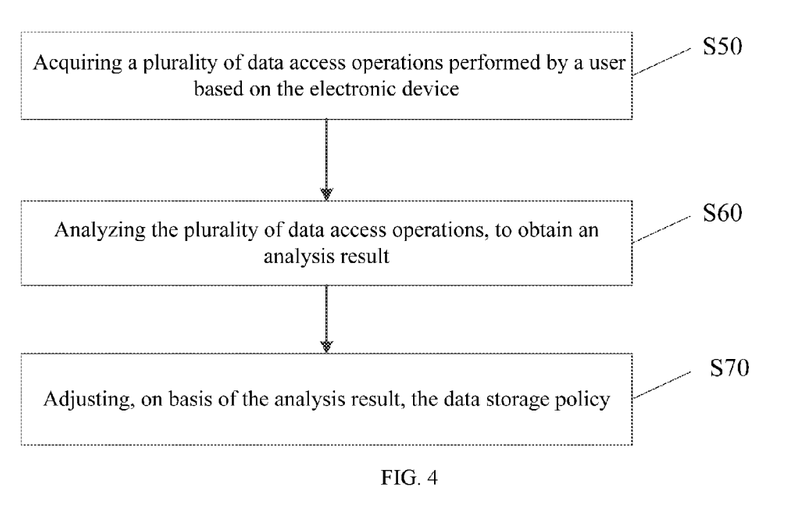
FIG. 4 is a schematic flowchart of a method of adjusting a data storage policy in the first embodiment of present application.

In the embodiment of the present application, as shown in FIG. 4, the method further comprises:

S50: acquiring a plurality of data access operations performed by a user based on the electronic device.

In the embodiment of the present application, the data access operations include data write operations and access operations to the cache as executed by the electronic device, in a process that the user is using the electronic device, the write operations and access operations executed by the electronic device to the cache can directly reflect user behaviors. For example, when the user edits a video via the electronic device, the data access operations are: the electronic device frequently access video data in the cache. Another example, when the user edits a document via the electronic device, the data access operations are: the electronic device frequently access document data in the cache. Yet another example, the user downloads a video whose format is rmvb via the electronic device, the data access operations are: the electronic device frequently writes video data whose format is rmvb into the cache.

Next, the electronic device executes S60: analyzing the plurality of data access operations, to obtain an analysis result.

To facilitate those skilled in the art more easily understand the contents of the present application, two specific examples will be provided below to illustrate the process of analyzing data access operations in the present application.

A first example, S60 comprises: analyzing the plurality of data access operations, to determine hot data and cold data, wherein the hot data refers to data that resides in the cache and is frequently accessed by the electronic device; the cold data is data that has been written into the cache and is accessed by the electronic device for a less number of times.

For example, it is assumed that the data access operation is: the electrode device frequently reads video data from the cache, then the video data can be regarded as the host data in the cache, so the analysis result is: determining the video data as the hot data. In a specific implementation, with video data as example, when determining whether the video data is the hot data, it may be determined according to the number of times that the video data is accessed by the electronic device within a period of time, wherein the period of time may be one hour, or two hours. For example, it is assumed that the electronic device accesses the video data for 60 times within one hour, then it can be determined that the video data is the hot data.

Another example, it is assumed that the data access operation is: the electrode device writes document data into the cache, after the document data is written into the cache, the electronic device does not access the document data or accesses the document data for a less number of times within a period of time, wherein the period of time may be one hour, or two hours, then it can be determined that the document data is the cold data.

Next, the electronic device executes S70: adjusting, on basis of the analysis result, the data storage policy.

Still with the video data is the hot data and the document data is the cold data as example, it is assumed that the current data storage policy is to directly write the video data that the electronic device needs to write into the cache into the flash with the cache being skipped, and to write the document data into the cache, then the adjusted data storage policy is to write the video data that the electronic device needs to write into the cache into the flash, and to write the document data into the flash with the cache being skipped.

In the embodiment of the present application, it is possible to adjust the data storage policy in real time, or set a cycle for adjusting the data storage policy, for example, adjustment is performed one time every two hours, or one time every day, the present application makes no limitations thereto.

A second example, S60 comprises: analyzing the plurality of data access operations, to determine whether the electronic device will perform a large amount of sequential write operations, in this case, if copied data or downloaded data is first written into the cache and then written into the flash, it requires performing two data write operations. It is assumed that the current data storage policy is to directly write the video data that the electronic device needs to write into the cache into the cache, then S70 comprises: on basis of the analysis result, adjusting the data storage policy as directly writing the video data that the electronic device needs to write into the flash with the cache being skipped. After adjusting the data storage policy, the electronic device will directly write the copied data or the downloaded data into the flash with the cache being skipped.

Second Embodiment

Based on the same invention concept, an embodiment of the present application provides an electronic device, as shown in FIGS. 5 and 6, the electronic device comprising:

a solid state memory 50;

the solid state memory 50 includes a storage device 501 and a storage controller 502;

the storage controller 502 is for determining, on basis of a running status parameter of the electronic device received, a data storage policy corresponding to the running status parameter; acquiring, on basis of the data storage policy, target data corresponding to the data storage policy; and writing, on basis of a data category of the target data, the target data into a flash or a cache of the solid state memory 50 of the electronic device.

Optionally, the electronic device further comprises:

a system event monitoring module 51 for acquiring a running status parameter of the electronic device.

Optionally, the system event monitoring module 51 is specially for:

acquiring a power remaining parameter of the electronic device.

Optionally, the storage controller 502 is specifically for:

determining whether the power remaining parameter is less than or equal to a first power threshold; and when the power remaining parameter is less than or equal to the first power threshold, determining that the data storage policy is to write data stored in the cache and data that the electronic device needs to write into the solid state memory 50 into the flash.

Optionally, the storage controller 502 is specifically for:

determining whether the power remaining parameter is greater than a second power threshold; and when the power remaining parameter is greater than the second power threshold, determining that the data storage policy is to write data that the electronic device needs to write into the solid state memory 50 into the cache.

Optionally, the system event monitoring module 51 is specially for:

acquiring a data feature of data being currently written by the electronic device into the cache;

the storage controller 502 is specifically for:

determining whether the data feature meets a predetermined condition; and when the data feature meets the predetermined condition, determining that the data storage policy is to write data that the electronic device needs to write into the cache into the flash.

Optionally, the system event monitoring module 51 is further for:

acquiring a plurality of data access operations performed by a user based on the electronic device;

the storage controller 502 is specifically for:

analyzing the plurality of data access operations, to obtain an analysis result; and adjusting, on basis of the analysis result, the data storage policy.

Third Embodiment

Figure 7:
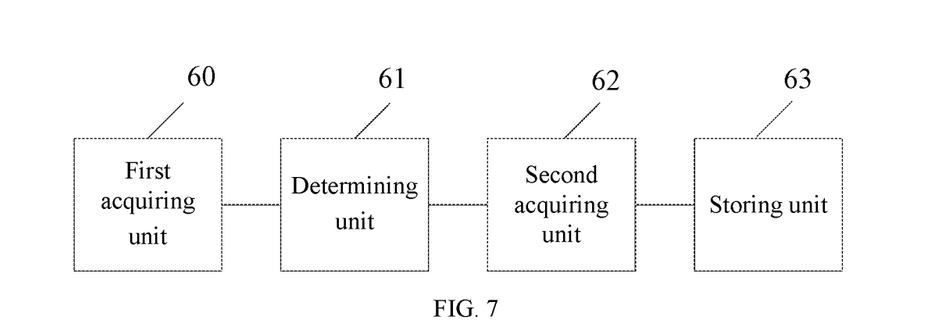
FIG. 7 is a structural block diagram of an electronic device in a third embodiment of the present application.

Based on the same invention concept, an embodiment of the present application further provides an electronic device, as shown in FIG. 7, the electronic device comprising:

a first acquiring unit 60 for acquiring a running status parameter of the electronic device;

a determining unit 61 for determining, on basis of the running status parameter, a data storage policy corresponding to the running status parameter;

a second acquiring unit 62 for acquiring, on basis of the data storage policy, target data corresponding to the data storage policy; and a storing unit 63 for writing, on basis of a data category of the target data, the target data into a flash or a cache of a solid state memory of the electronic device.

Optionally, the first acquiring unit 60 is specially for:

acquiring a power remaining parameter of the electronic device.

Optionally, the determining unit 61 is specifically for:

determining whether the power remaining parameter is less than or equal to a first power threshold; and when the power remaining parameter is less than or equal to the first power threshold, determining that the data storage policy is to write data stored in the cache and data that the electronic device needs to write into the solid state memory into the flash.

Optionally, the determining unit 61 is specifically for:

determining whether the power remaining parameter is greater than a second power threshold; and when the power remaining parameter is greater than the second power threshold, determining that the data storage policy is to write data that the electronic device needs to write into the solid state memory into the cache.

Optionally, the first acquiring unit 60 is specially for:

acquiring a data feature of data being currently written by the electronic device into the cache;

the determining unit 61 is specifically for:

determining whether the data feature meets a predetermined condition; and when the data feature meets the predetermined condition, determining that the data storage policy is to write data that the electronic device needs to write into the cache into the flash.

Optionally, the first acquiring unit 60 is further for:

acquiring a plurality of data access operations performed by a user based on the electronic device;

the determining unit 61 is specifically for:

analyzing the plurality of data access operations, to obtain an analysis result; and adjusting, on basis of the analysis result, the data storage policy.

By means of one or more technical solutions provided in the embodiments of the present application, one or more of the following technical effects or advantages can be achieved:

1. In the solution according to an embodiment of the present application, the following means are adopted: acquiring a running status parameter of an electronic device;

determining, on basis of the running status parameter, a data storage policy corresponding to the running status parameter; acquiring, on basis of the data storage policy, target data corresponding to the data storage policy; and writing, on basis of a data category of the target data, the target data into a flash or a cache of a solid state memory of the electronic device. A different running status parameter is corresponded to a different data storage policy, thereby the data storage policy can be determined flexibly according to the running status parameter of the electronic device, so that current data is written into the flash or the cache, thus mitigating the technical problem that the system's writing manner is fixed, t.

2. In the solution according to an embodiment of the present application, the running status parameter may be a power remaining parameter, and when the power remaining parameter is less than or equal to the first power threshold, i.e., the system has low power, data in the cache is written into the flash, and data that the electronic device needs to write subsequently is directly written into the flash, with the cache being skipped, thus solving the technical problem of system data loss caused by that when an abnormal power failure occurs the system, data in the cache fails to be written back into the flash in time, the technical effect of improving data security is achieved.

3. In the solution according to an embodiment of the present application, the following means are adopted: acquiring a data feature of data being currently written by the electronic device into the cache; determining whether the data feature meets a predetermined condition; and when the data feature meets the predetermined condition, determining that the data storage policy is to write data that the electronic device needs to write into the cache into the flash. In the embodiment of the present application, the predetermined condition may be set in advance, for example, data continuous write time, data format etc., and when the data feature meets the predetermined condition, data is directly written into the flash. For example, when there is a large number of sequential write operations in the system, data is directly written into the flash particles with the cache being skipped, thus avoiding swapping out hot data in the cache, the hot data refers to data that resides in the cache and is frequently accessed by the electronic device.

4. In the solution according to an embodiment of the present application, the following means are adopted: acquiring a plurality of data access operations performed by a user based on the electronic device; analyzing the plurality of data access operations, to obtain an analysis result; and adjusting, on basis of the analysis result, the data storage policy. And the technical effect of smart-learning user behaviors to adjust the storage policy, so that the storage policy can better adapt to usage habits of the user, user experience is enhanced.

Those skilled in the art should understand that, the embodiments of the present application can be provided as a method, a system or a computer program product. Therefore, the present application can adopt forms of a full hardware embodiment, a full software embodiment, or an embodiment combining software and hardware aspects. And, the present application can adopt forms of a computer program product implemented on one or more computer usable storage mediums (including, but not limited to, magnetic disk storage, CD-ROM, optical memory, or the like) including computer usable program codes.

The present application is described by referring to flow charts and/or block diagrams of method, apparatus (system) and computer program product according to the embodiments of the present application. It should be understood that each flow and/or block in the flow charts and/or block diagrams and the combination of the flow and/or block in the flow charts and/or block diagrams can be implemented by computer program instructions. These computer program instructions can be provided to processors of a general purpose computer, a dedicated computer, an embedded processor or other programmable data processing apparatus to generate a machine, so that a device for implementing functions specified in one or more flows of the flow charts and/or one or more blocks of the block diagrams is generated by the instructions executed by the processors of the computer or other programmable data processing apparatus.

These computer program instructions can also be stored in computer readable storage which is able to direct the computer or other programmable data processing apparatus to operate in specific manners, so that the instructions stored in the computer readable storage generate manufactured articles including commander equipment, which implements functions specified by one or more flows in the flow charts and/or one or more blocks in the block diagrams.

These computer program instructions can be loaded to computer or other programmable data processing apparatus, so that a series of operation steps are executed on the computer or other programmable apparatus to generate computer implemented process, so that the instructions executed on the computer or other programmable apparatus provide steps for implementing functions specified in one or more flows of the flow charts and/or one or more blocks of the block diagrams.

In particular, the computer program instructions to which the data storage method in the embodiments of the present application correspond can be stored in an optical disk, a hard disk, a U disk and other storage medium, when the computer program instructions corresponding to the data storage method as stored in the storage medium are read or executed by an electronic device, the following steps are comprised:

acquiring a running status parameter of an electronic device;

determining, on basis of the running status parameter, a data storage policy corresponding to the running status parameter;

acquiring, on basis of the data storage policy, target data corresponding to the data storage policy; and writing, on basis of a data category of the target data, the target data into a flash or a cache of a solid state memory of the electronic device.

Optionally, in the process that the computer instruction corresponding to the step of acquiring a running status parameter of an electronic device as stored in the storage medium is executed, the following step is comprised in particular:

acquiring a power remaining parameter of the electronic device.

Optionally, in the process that the computer instruction corresponding to the step of determining, on basis of the running status parameter, a data storage policy corresponding to the running status parameter as stored in the storage medium is executed, the following step is comprised in particular:

determining whether the power remaining parameter is less than or equal to a first power threshold; and when the power remaining parameter is less than or equal to the first power threshold, determining that the data storage policy is to write data stored in the cache and data that the electronic device needs to write into the solid state memory into the flash.

Optionally, in the process that the computer instruction corresponding to the step of determining, on basis of the running status parameter, a data storage policy corresponding to the running status parameter is executed as stored in the storage medium, the following step is comprised in particular:

determining whether the power remaining parameter is greater than a second power threshold; and when the power remaining parameter is greater than the second power threshold, determining that the data storage policy is to write data that the electronic device needs to write into the solid state memory into the cache.

Optionally, in the process that the computer instruction corresponding to the step of acquiring a running status parameter of an electronic device as stored in the storage medium is executed, the following step is comprised in particular:

acquiring a data feature of data being currently written by the electronic device into the cache;

Optionally, in the process that the computer instruction corresponding to the step of determining, on basis of the running status parameter, a data storage policy corresponding to the running status parameter is executed as stored in the storage medium, the following step is comprised in particular:

determining whether the data feature meets a predetermined condition; and when the data feature meets the predetermined condition, determining that the data storage policy is to write data that the electronic device needs to write into the cache into the flash.

Optionally, the storage medium further stores some other computer instructions, when these computer instructions are executed, the following steps are comprised:

acquiring a plurality of data access operations performed by a user based on the electronic device;

analyzing the plurality of data access operations, to obtain an analysis result; and adjusting, on basis of the analysis result, the data storage policy.

Although the preferred embodiments of the present application have been described, those skilled in the art can make additional changes and modifications to these embodiments once learning the basic inventive concepts thereof. Therefore, the appended claims are intended to be interpreted as including the preferred embodiments as well as all changes and modifications that fall into the scope of the present application.

Obviously, those skilled in the art can make various modifications and variations to the present application without departing from the spirit and scope thereof. Thus, if these modifications and variations of the present application are within the scope of the claims of the application as well as their equivalents, the present application is also intended to include these modifications and variations.

The invention claimed is:

1. A data storage method comprising:
   acquiring a power remaining parameter of an electronic device and a data feature of data being currently written by the electronic device into the cache;
   determining whether the power remaining parameter is less than or equal to a first power threshold; and
   when the power remaining parameter is less than or equal to the first power threshold, determining that the data storage policy is to write data stored in the cache into the flash, and
   determining whether the data feature meets a predetermined condition, the data feature being a length of continuous write time of data and/or data format and/or an amount of data written per unit time,
   when the data feature meets the predetermined condition, determining that the data storage policy is to write data that the electronic device needs to write into the cache into the flash
   acquiring, on basis of the data storage policy, target data corresponding to the data storage policy; and
   writing, on basis of a data category of the target data, the target data into a flash or a cache of a solid state memory of the electronic device.

2. The method of claim 1, further comprising:
   determining whether the power remaining parameter is greater than a second power threshold; and
   when the power remaining parameter is greater than the second power threshold, determining that the data storage policy is to write data that the electronic device needs to write into the solid state memory into the cache.

3. The method of claim 1, further comprising:
   acquiring a plurality of data access operations performed by a user based on the electronic device;
   analyzing the plurality of data access operations to obtain an analysis result; and
   adjusting, on basis of the analysis result, the data storage policy.

4. An electronic device comprising a solid state memory that includes a storage device and a storage controller wherein the storage controller determines, on basis of a running status parameter of the electronic device received, a data storage policy corresponding to the running status parameter; acquires, on basis of the data storage policy, target data corresponding to the data storage policy; and writes, on basis of a data category of the target data, the target data into a flash or a cache of the solid state memory of the electronic device, and wherein
   the electronic device further includes a system event monitoring module for acquiring a running status parameter of the electronic device,
   the system event monitoring module acquires a power remaining parameter of the electronic device and a data feature of data being currently written by the electronic device into the cache,
   the storage controller determines whether the power remaining parameter is less than or equal to a first power threshold; and when the power remaining parameter is less than or equal to the first power threshold, determines that the data storage policy is to write data stored in the cache into the flash, and determines whether the data feature meets a predetermined condition, the data feature being a length of continuous write time of data and/or data format and/or an amount of data written per unit time, and when the data feature meets the predetermined condition, determines that the data storage policy is to write data that the electronic device needs to write into the cache into the flash.

5. The electronic device of claim 4 wherein the storage controller determines whether the power remaining parameter is greater than a second power threshold; and when the power remaining parameter is greater than the second power threshold, determines that the data storage policy is to write data that the electronic device needs to write into the solid state memory into the cache.

6. The electronic device of claim 4, wherein the system event monitoring module acquires a plurality of data access operations performed by a user based on the electronic device; and the storage controller analyzes the plurality of data access operations, to obtain an analysis result and adjusts, on basis of the analysis result, the data storage policy.

7. An electronic device comprising:
a first acquiring unit for acquiring a running status parameter of the electronic device;
a determining unit for determining, on basis of the running status parameter, a data storage policy corresponding to the running status parameter;
a second acquiring unit for acquiring, on basis of the data storage policy, target data corresponding to the data storage policy;
a storing unit for writing, on basis of a data category of the target data, the target data into a flash or a cache of a solid state memory of the electronic device; and
a system event monitoring module for acquiring a running status parameter of the electronic device and acquiring a power remaining parameter of the electronic device and a data feature of data being currently written by the electronic device into the cache,
wherein the storage unit determines whether the power remaining parameter is less than or equal to a first power threshold and when the power remaining parameter is less than or equal to the first power threshold, determines that the data storage policy is to write data stored in the cache into the flash, and determines whether the data feature meets a predetermined condition, the data feature being a length of continuous write time of data and/or data format and/or an amount of data written per unit time, and when the data feature meets the predetermined condition, determines that the data storage policy is to write data that the electronic device needs to write into the cache into the flash.

* * * * *